United States Patent [19]

Curley et al.

[11] Patent Number: 5,447,411

[45] Date of Patent: Sep. 5, 1995

[54] LIGHT WEIGHT FAN BLADE CONTAINMENT SYSTEM

[75] Inventors: Robert C. Curley, White Marsh; Mark T. Fisher, Bel Air; James V. Dileonardi, Baltimore; A. Norton DePinho, Jr., Baldwin, all of Md.

[73] Assignee: Martin Marietta Corporation, Bethesda, Md.

[21] Appl. No.: 74,636

[22] Filed: Jun. 10, 1993

[51] Int. Cl.$^6$ ............................................. F01D 21/00
[52] U.S. Cl. ............................... 415/9; 415/200; 156/60; 156/71; 156/292; 156/307.7; 156/327; 428/49; 428/198; 428/252
[58] Field of Search ................ 415/9, 196, 197, 200, 415/215.1; 156/60, 71, 292, 307.7, 327; 428/49, 198, 252

[56] References Cited

U.S. PATENT DOCUMENTS

| | | |
|---|---|---|
| 3,126,149 | 3/1964 | Bowers et al. . |
| 3,607,600 | 9/1971 | Schreter et al. . |
| 3,936,219 | 2/1976 | Holmes ................... 415/9 |
| 4,038,118 | 7/1977 | James . |
| 4,063,847 | 12/1977 | Simmons . |
| 4,200,677 | 4/1980 | Bottini et al. ................ 428/252 |
| 4,377,370 | 3/1983 | Porceili . |
| 4,398,866 | 8/1983 | Hartel et al. . |
| 4,411,589 | 10/1983 | Joubert et al. . |
| 4,425,080 | 1/1984 | Stanton et al. . |
| 4,452,563 | 6/1984 | Belanger et al. . |
| 4,452,565 | 6/1984 | Monhardt et al. . |
| 4,508,486 | 4/1985 | Tinker . |
| 4,534,698 | 8/1985 | Tomich . |
| 4,547,122 | 10/1985 | Leech . |
| 4,646,810 | 3/1987 | Lardellier . |
| 4,666,371 | 5/1987 | Alderson . |
| 4,696,866 | 9/1987 | Tanaka et al. . |
| 4,699,567 | 10/1987 | Stewart . |
| 4,705,454 | 11/1987 | Bouiller et al. . |
| 4,718,818 | 1/1988 | Premont . |
| 4,818,176 | 4/1989 | Huether et al. . |
| 4,818,584 | 4/1989 | Eisenmann ................... 428/198 |
| 4,902,201 | 2/1990 | Neubert . |
| 4,961,685 | 10/1990 | Neubert . |
| 5,050,241 | 9/1991 | Flowers et al. ................ 428/198 |
| 5,188,505 | 2/1993 | Schilling et al. . |
| 5,234,752 | 8/1993 | Laflin et al. ................... 428/252 |

OTHER PUBLICATIONS

"Containment of Composite Fan Blades" by C. L. Stotler and A. P. Coppa dated Jul. 1979.
"Development of Advanced Lightweight Systems Containment" by C. L. Stotler dated May 1981.
"Development of an Advanced Fan Blade Containment System" Alan D. Lane dated Aug. 1989.

Primary Examiner—Edward K. Look
Assistant Examiner—Christopher Verdier
Attorney, Agent, or Firm—Gay Chin; Stephen A. Young; William H. Meise

[57] ABSTRACT

A method for fabricating a hard faced fan blade containment system for turbofan aircraft engines, and the product resulting from that method. The product combines a hard facing material, a high strength fiber and an elastomeric binder to form a fan blade containment system which is lightweight and effectively retains fan blade fragments. The method consists of lightly bonding layers of high strength fibers together with a small amount of elastomeric binder so that they work in unison as a composite to contain a failed fan blade rather than as individual layers which are subject to sequential failure. In addition, a hard material such as ceramic or heat treated steel is encapsulated in an elastomer and bonded to the impact face of the containment system to blunt sharp edges of failed blade fragments and to spread the impact energy of the blade fragments over a larger area of the high strength fiber backing.

16 Claims, 2 Drawing Sheets

LIGHT WEIGHT FAN BLADE CONTAINMENT SYSTEM

BACKGROUND OF THE INVENTION

1. Field of the Invention

The present invention relates to a fan blade containment system for use with an aircraft turbofan engine. An important requirement in modern aircraft turbofan engines in commercial service is that they retain fan blades or fan blade pieces which may break off during engine operation. Fan blade failure can occur for a variety of reasons, but is commonly caused when a bird, hailstone or any other foreign object strikes the engine fan while the engine is in operation. If a fan blade or blade fragment is not retained by a suitable containment system, the blade or blade fragment—which travels at a high velocity upon failure—can cause serious damage to parts of the aircraft. It is therefore necessary to provide some containment system near the engine fan for retaining any blade or blade fragments which break off the engine fan during operation. Such a containment system should be provided near the point where fan blade failure will cause the blade or blade fragment to travel.

2. Description of the Related Art

Fan blade containment systems have been previously proposed for use in turbofan engines. The objective of such containment systems has been to provide adequate retention of fan blade fragments without increasing the overall weight of the engine shroud, thereby decreasing engine performance. Certain prior art containment systems utilized a metallic honeycomb structure for retaining fan blade fragments—examples of these types of systems can be found in U.S. Pat. Nos. 3,126,149; 4,063,847; 4,377,370; 4,452,565; 4,534,698; 4,547,122; 4,666,371; 4,705,454; 5,188,505; "Development of Advanced Lightweight Systems Containment: Final Report," C. L. Stotler (N.A.S.A., May 1981) and "Containment of Composite Fan Blades: Final Report," C. L. Stotler and A. P. Coppa (N.A.S.A, July 1979). Other prior art systems show the use of a fibrous or fabric band wrapped around the interior portion of the engine shroud as a mechanism for fan blade retention—for example, U.S. Pat. Nos. 4,038,118; 4,063,847; 4,377,370; 4,411,589; 4,425,080; 4,452,565; 4,452,563; 4,534,698; 4,699,567; 4,705,454; 4,718,818; 4,818,176; 4,902,201; 4,961,685; "Development of Advanced Lightweight Systems Containment: Final Report," C. L. Stotler (N.A.S.A., May 1981) and "Containment of Composite Fan Blades: Final Report," C. L. Stotler and A. P. Coppa (N.A.S.A, July 1979). Other prior art systems disclose the use of ceramics as a part of an overall fan blade retention system—for example, U.S. Pat. Nos. 4,289,447; 4,547,122; 4,646,810; 4,818,176 and "Development of an Advanced Fan Blade Containment System," Alan D. Lane (F.A.A., August 1989).

SUMMARY OF THE INVENTION

It is desirable when providing a fan blade containment system that the system be as lightweight as possible, while still retaining good blade retention characteristics. Furthermore, such a system should prevent penetration of fan blade fragments into the interior of the engine nacelle, where it may cause damage to hoses or other components necessary to the proper operation of the engine. Any containment system must also reduce or eliminate the possibility that blade fragment impacts will dislodge portions of the containment system, which portions can also cause damage to the engine or other portions of the aircraft. Finally, such a system should be resistant to rupture or fragmentation caused by the impact of sharp fan blade fragment edges.

It is the object of the present invention to provide a fan blade retention system which is extremely lightweight, which retains failed fan blades so as to prevent damage to portions of the aircraft and which is not itself damaged by fan blade impacts so as to cause damage to the engine, engine components, or to the aircraft itself. Containment systems which rely on fibrous materials as a retention mechanism are often subject to sequential failure of fibrous bands caused by cutting of the bands by a sharp blade fragment. The present invention avoids this problem by using ceramic tiles to blunt sharp edges and to reduce the momentum of blade fragments, so as to resist cutting of the fibrous retention band. The instant invention also prevents the ceramic tiles from releasing large chips—which chips can themselves cause additional engine damage—by encapsulating the tiles in an elastomeric material.

The present invention accomplishes the need for a lightweight, failure-resistant containment system by the use of a unique combination of elastomer-coated ceramic tiles, as well as lightly bonded fabric layers overlaying the layer of ceramic tiles. The resulting structure is of much lighter weight than previous fan blade retention systems, reduces tearing of the fabric layer by fan blade fragments which may reduce the effectiveness of the containment system, and prevents fan blade impacts from causing the release of large tile fragments, which could lead to engine damage.

DESCRIPTION OF THE PREFERRED EMBODIMENTS

Figure 1:
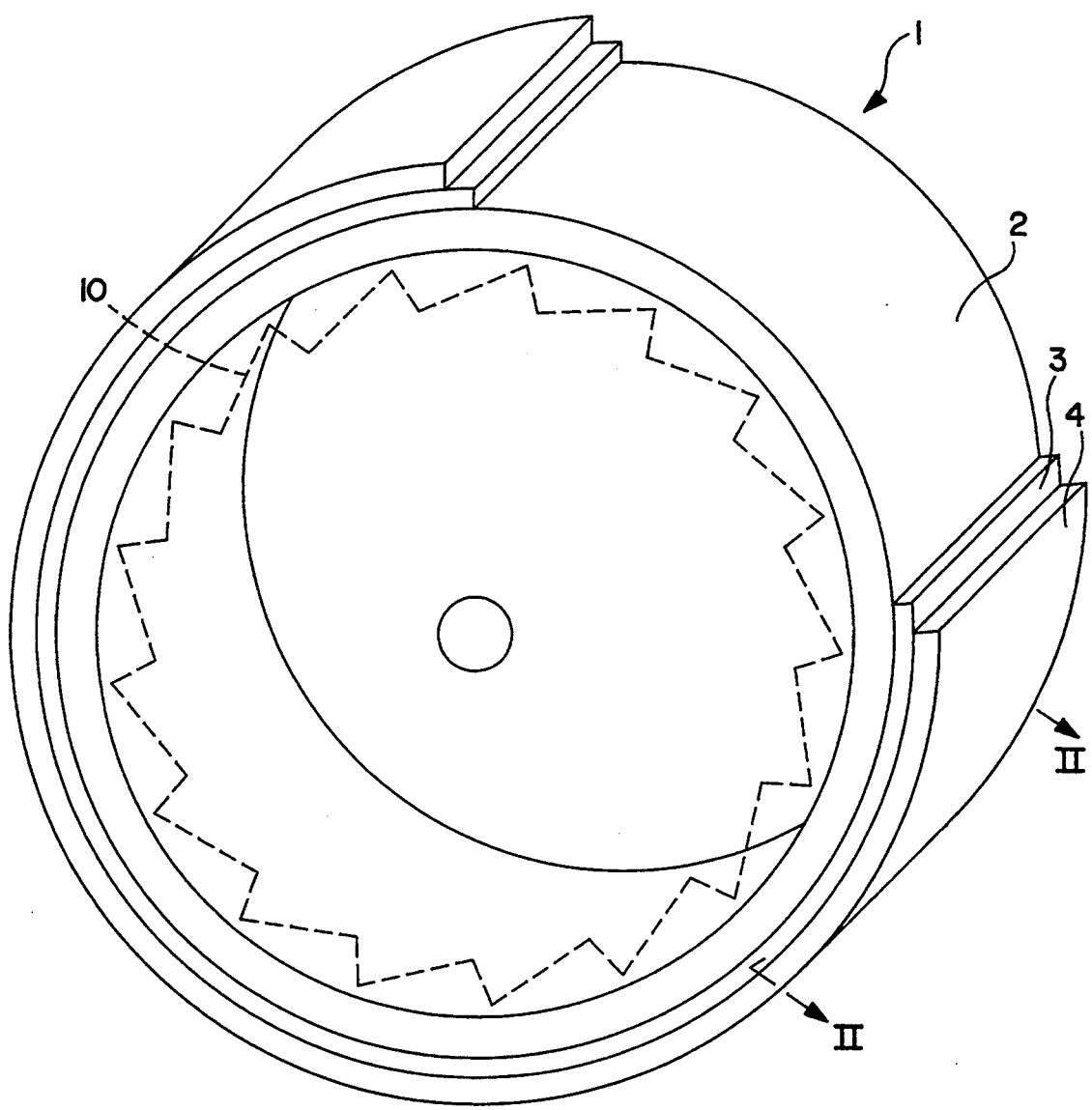
FIG. 1 is a schematic representation of the containment system of the present invention.

FIG. 1 shows a schematic representation of the fan blade containment system 1 of the present invention. The fan blade containment system 1 consists of a conventional fan case 2 manufactured of, e.g., steel, aluminum, titanium, or any other lightweight, high-strength material, to which a hard facing layer 3 is bonded. Wrapped around the hard facing layer 3 is a fibrous backing layer 4. The containment system 1 of the present invention surrounds a turbofan engine fan 10 to retain any fan blades or fan blade fragments dislodged from the engine fan 10.

Figure 2:
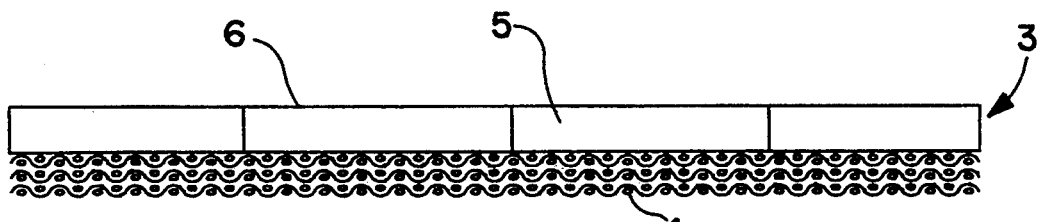
FIG. 2 is a cross-sectional schematic representation of the hard facing layer and fibrous backing layer of the present invention.

FIG. 2 shows a cross-sectional schematic representation of the hard facing layer 3 and fibrous backing layer 4 of the present invention. The hard facing layer consists hard facing tiles 5, made of either a ceramic material or of hardened metal. If the hard facing tiles 5 are constructed of ceramic, these tiles can be constructed of, e.g., alumina, silicon carbide, boron carbide, titanium diboride, or aluminum nitride. If the hard facing tiles 5 are constructed of a hardened metal, a heat treated steel may be used. In general, a low density ceramic—preferably boron carbide—is the preferred material for the hard facing tiles 5. The hard facing layer 3 assists in blunting any sharp edges on fan blade fragments which could cut through the fibrous backing layer 4, and also acts to distribute the fan blade impact over a larger area of the fibrous backing layer 4. The hard facing tiles 5 are encapsulated on all sides by an elastomeric material 6 to isolate the ceramic tile material from one another so as to prevent propagation of impact damage from tiles in the path of a failed fan blade to tiles not directly impacted. This arrangement minimizes the size of the area damaged when a fan blade fragment impacts the containment system. The elastomeric material 6 is, preferably a castable, low-temperature curing, two component polyurethane such as PR-1592, but can also be any natural or synthetic elastomer. After the hard facing tiles 5 have been encapsulated by the elastomeric material 6, they are bonded to the conventional metal fan blade case 2. The bonding material can preferably be a low-temperature curing polyurethane elastomer such as PR-1592, but can include any natural or synthetic resin or elastomer.

Figure 3A:
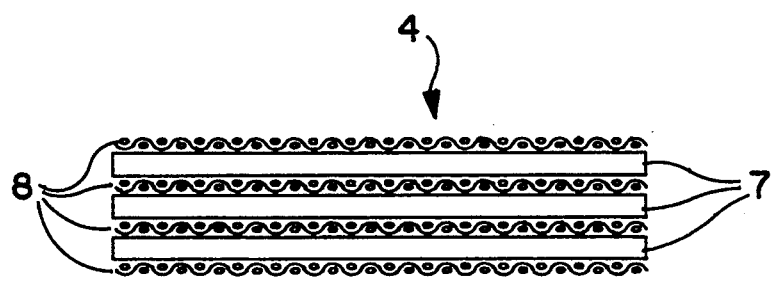
FIGS. 3a and 3b are cross-sectional schematic representations of two alternative configurations of the fibrous backing layer of the present invention.
Figure 3B:
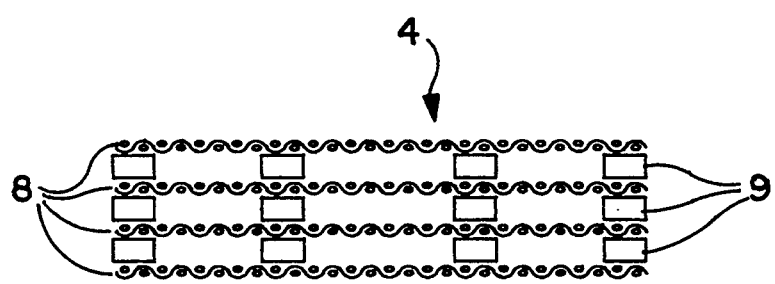

FIGS. 3a and 3b show cross-sectional schematic representations of two of three alternative configurations of the fibrous backing layer 4 of the present invention. In FIG. 3a, the fibrous backing layer 4 uses continuous binder layers 7 interspersed between layers of fabric 8. The fabric layers are preferably constructed of any high-strength, tough fiber, such as an aramid, but can also include polyethylene, nylon, glass or carbon. Kevlar 29, in a bi-directional woven fabric, is the preferred material for fabric layer 8. The binder layers are preferably a polyurethane elastomer such as PR-1592, but can include any natural or synthetic resin or elastomer. As each fabric layer 8 is applied over the surface of the hard facing layer 3, a thin film of a binder material is applied to the surface of the individual fabric layers 8. The binder material is applied in a manner such that it remains on the surface of the individual fabric layers 8 and does not impregnate the fabric material. After the application of each of the fabric layers 8 is complete, the binder material is cured to form the binder layers 7.

FIG. 3b shows an alternative configuration of the fibrous backing layer 4 which uses intermittent layers of binder 9. The binder layers 9 are applied in discrete bands, squares or circles to allow better control of the amount of bonding achieved in the final product. As with the continuous binder layers 7, a thin layer of binder is applied to surface of the individual fabric layers 8 so as not to impregnate the fabric material. After application of each of the fabric layers 8 is complete, the binder material is cured to form the binder layers 7. A third approach to bonding the fabric layers 8 to the hard facing layer 3 is to impregnate the fabric layers 8 with a small amount of binder to form a porous low strength laminate. This process would be accomplished by impregnating the fabric layers 8 with a long shelf-life, low temperature curing bonding material, which fabric layers would later be wrapped over the hard facing layer 3 and cured to form a bond. The fabric layers 8 may be in any convenient form such as roving, fabric or felt, but is preferably constructed of a bi-directional woven fabric.

The fan blade containment system 1 of the present invention is manufactured according the following steps. First, the tiles 5 are provided, preferably tiles of a low density ceramic. Next, the tiles 5 are coated in an elastomeric material 6, preferably a castable, low temperature curing polymer such as PR-1592. The coating step is preferably accomplished by placing the tiles in a closed mold—shaped to form either the entire array of the hard facing layer or a section of that layer—into which the elastomeric resin is injected. After the tiles 5 have been coated with the elastomeric material 6, the elastomeric material is allowed to cure to form the elastomeric layer 6.

Next, the coated tiles 5 are bonded to the metallic fan case 2, preferably using a low curing temperature polymer such as PR-1592. After the bonding material is allowed to cure, the fan case 2 with coated tiles bonded thereto is overwrapped with the fibrous backing layer 4. The fibrous backing layer 4 is wrapped over the hard facing layer 3 in one of three different ways. In the first method (represented by FIG. 3a), a thin film of binder 7, preferably also a low curing temperature polymer such as PR-1592, is applied to the surface of each layer of fabric e such that it remains on the surface of the individual fabric layers 8 and does not impregnate the fabric material. The one or more layers 8—depending upon the particular application—of the fabric material are then wrapped over the coated tiles 5 and the bonding material is then cured to form binder layers 7.

In the second method of forming the backing layer 4, the fabric layer 8 the binder is applied in the same manner as in the first method, except that the fabric layers 8 are not completely coated with binder, but instead the binder is applied in discrete bands, squares or circles to form an intermittent binder layer 7. The fabric layers 8 are then overlayed as in the first method, and cured.

The third method of forming the backing layer 4 entails impregnating the layers with a small amount of binder to form a porous low strength laminate. This method is accomplished by impregnating the fabric material with a long shelf life, low temperature curing, polymer, which is later cured after the wrapping step is completed. The resulting backing layer can take the form of that shown in either FIGS. 3a or 3b.

What is claimed is:

1. A method of forming a fan blade containment system for a turbofan engine comprising the steps of:
    a. providing a fan blade case;
    b. providing a plurality of hard facing tiles;
    c. encapsulating said hard facing tiles in an elastomeric material to form fully coated hard facing tiles;
    d. bonding said coated hard facing tiles to said fan blade case;
    e. providing at least one layer of a fibrous backing material;
    f. bonding said at least one layer of a fibrous backing material to said coated hard facing tiles.

2. The method of claim 1, wherein:
    said step of providing hard facing tiles comprises providing ceramic tiles.

3. The method of claim 1, wherein:
    said step of providing hard facing tiles comprises providing heat treated steel tiles.

4. The method of claim 1, wherein:
    said step of providing hard facing tiles comprises providing tiles constructed of boron carbide.

5. The method of claim 1, wherein:
    said step of providing at least one layer of a fibrous backing material comprises providing a layer of a bi-directional woven Kevlar.

6. The method of claim 1, wherein:
    said step of providing at least one layer of a fibrous backing material comprises providing a plurality of layers of fibrous backing material, and wherein said step of bonding said at least one layer of a fibrous backing material to said coated hard facing tiles comprises bonding said plurality of layers of fibrous backing material to one another and to said elastomeric encapsulation of said hard facing tiles.

7. The method of claim 6, wherein:

said step of bonding said at least one layer of a fibrous backing material to said coated hard facing tiles comprises:
 a. applying a thin film of a binder to each said layer of fibrous backing material such that said binder remains on the surface of the individual layers and does not fully impregnate said layers of fibrous backing material;
 b. overlaying said plurality of layers over said coated hard facing tiles; and
 c. curing said binder.

8. The method of claim 6, wherein said step of bonding said at least one layer of a fibrous backing material to said coated hard facing tiles comprises:
 a. applying a binder in intermittent bands to each layer of fibrous backing material such that said binder does not impregnate the entire surface of each said layer of fibrous backing material;
 b. overlaying said plurality of layers over said coated hard facing tiles; and
 c. curing said binder.

9. The method of claim 6, wherein said step of bonding said at least one layer of a fibrous backing material to said hard facing tiles comprises:
 a. impregnating each layer of fibrous backing material with a binder;
 b. overlaying said plurality of layers over said coated hard facing tiles; and
 c. curing said binder.

10. A fan blade containment system comprising:
 a. A fan blade case;
 b. a plurality of elastomer-encapsulated hard facing tiles bonded to the outer surface of said fan blade case; and
 c. a fibrous backing layer bonded to the outer surface of said plurality of elastomer-encapsulated hard facing tiles.

11. The fan blade containment system of claim 10, wherein:

said hard facing tiles are constructed of boron carbide.

12. The fan blade containment system of claim 10, wherein:

said hard facing tiles are coated with a castable, low temperature curing, polymer.

13. The fan blade containment system of claim 10, wherein:

said elastomer-encapsulated hard facing tiles are bonded to said fan blade case with a low temperature curing polymer.

14. The fan blade containment system of claim 10, wherein:

said fibrous backing layer is constructed of at least one layer of a bi-directional woven Kevlar.

15. The fan blade containment system of claim 10, wherein:

said fibrous backing layer is constructed of a plurality of layers of a bi-directional woven Kevlar, and wherein said plurality of layers are bonded in layers to one another.

16. The fan blade containment system of claim 15, wherein:

said plurality of layers are bonded to one another with a low temperature curing polymer.

* * * * *

UNITED STATES PATENT AND TRADEMARK OFFICE
CERTIFICATE OF CORRECTION

PATENT NO. :    5,447,411
DATED       :    September 5, 1995
INVENTOR(S) :   Robert C. Curley et al It is certified that error appears in the above-indentified patent and that said Letters Patent is hereby corrected as shown below:

Column 4, line 18, "fabric e" should read --fabric 8--.

Signed and Sealed this

Tenth Day of September, 1996

Attest:

BRUCE LEHMAN

*Attesting Officer*            *Commissioner of Patents and Trademarks*